United States Patent
Racov et al.

(10) Patent No.: US 9,517,555 B2
(45) Date of Patent: Dec. 13, 2016

(54) BATTERY OPERATED HANDHELD POWER TOOL

(75) Inventors: Mikael Racov, Huskvarna (SE);
Henrik Hvitman, Norrahammar (SE);
Peter Gunnarsson, Gränna (SE)

(73) Assignee: HUSQVARNA AB, Huskvarna (SE)

( * ) Notice: Subject to any disclaimer, the term of this patent is extended or adjusted under 35 U.S.C. 154(b) by 231 days.

(21) Appl. No.: 14/353,427

(22) PCT Filed: Oct. 27, 2011

(86) PCT No.: PCT/SE2011/051280
§ 371 (c)(1),
(2), (4) Date: Apr. 22, 2014

(87) PCT Pub. No.: WO2013/062457
PCT Pub. Date: May 2, 2013

(65) Prior Publication Data
US 2014/0259692 A1    Sep. 18, 2014

(51) Int. Cl.
*B25F 5/00* (2006.01)
*A01D 34/90* (2006.01)

(52) U.S. Cl.
CPC .............. *B25F 5/008* (2013.01); *A01D 34/90* (2013.01)

(58) Field of Classification Search
CPC ............ A01D 34/30; B25F 5/008; H02K 9/04
See application file for complete search history.

(56) References Cited

U.S. PATENT DOCUMENTS

| 4,136,446 A | 1/1979 | Tripp |
| 4,156,967 A | 6/1979 | Ballas, Sr. |
| 4,338,719 A | 7/1982 | Burkholder |
| 4,338,720 A | 7/1982 | Pittinger, Sr. et al. |
| 5,615,970 A | 4/1997 | Reekie et al. |

(Continued)

FOREIGN PATENT DOCUMENTS

| CN | 101817176 A | 9/2010 |
| JP | H0662637 A | 3/1994 |

(Continued)

OTHER PUBLICATIONS

International Search Report and Written Opinion of PCT/SE2011/051280 mailed Jul. 2, 2012.

(Continued)

*Primary Examiner* — Hwei C Payer
(74) *Attorney, Agent, or Firm* — Nelson Mullins Riley & Scarborough LLP

(57) ABSTRACT

A battery operated handheld power tool, comprising a working tool assembly (20), a handle assembly (10) and an elongate tubular rod (30). The working tool assembly (20) comprises a motor housing (26) having a first inner space (27), comprising an electric motor (21) with a fan (25). The first inner space (27) is connected to the exterior of the working tool assembly (20) by means of at least one air outlet (28). The handle assembly (10) comprises a second inner space (19) in which a control unit (15) is positioned, the second inner space (19) being in flow communication with the exterior of the handle assembly (10). The elongate tubular rod (30) defines an air guiding channel (33), in flow communication with the first inner space (27) and the second inner space (19).

19 Claims, 3 Drawing Sheets

(56) References Cited

U.S. PATENT DOCUMENTS

| | | | | |
|---|---|---|---|---|
| 5,856,715 | A * | 1/1999 | Peot | B23D 45/16 30/388 |
| 7,646,118 | B2 * | 1/2010 | Yoshida | H02K 11/33 30/276 |
| 8,098,036 | B2 * | 1/2012 | Matsunaga | H02P 29/00 30/276 |
| 8,573,323 | B2 * | 11/2013 | Muller | A01D 34/902 173/171 |
| 2003/0037933 | A1 | 2/2003 | Breneman et al. | |
| 2009/0090094 | A1 | 4/2009 | Million et al. | |
| 2010/0218385 | A1 | 9/2010 | Mang et al. | |
| 2011/0241457 | A1 | 10/2011 | Mueller et al. | |
| 2013/0270933 | A1 * | 10/2013 | Kraetzig | H02K 7/145 310/50 |
| 2014/0215835 | A1 * | 8/2014 | Racov | A01D 34/416 30/276 |
| 2014/0246214 | A1 * | 9/2014 | Racov | A01D 34/902 173/217 |
| 2014/0259692 | A1 * | 9/2014 | Racov | B25F 5/008 30/277.4 |

FOREIGN PATENT DOCUMENTS

| | | |
|---|---|---|
| JP | H0662638 A2 | 3/1994 |
| WO | 2011039978 A2 | 4/2011 |

OTHER PUBLICATIONS

Chapter I International Preliminary Report on Patentability of PCT/SE2011/051280 mailed Apr. 29, 2014,.

* cited by examiner

BATTERY OPERATED HANDHELD POWER TOOL

TECHNICAL FIELD

The invention relates to battery operated handheld power tools, and in particular to battery operated handheld power tools having a working tool assembly comprising an electric motor, a handle assembly to which a battery pack may be connected, and an elongate rod interconnecting the working tool assembly and the handle assembly so as to position the working tool assembly at a convenient distance from the handle assembly.

BACKGROUND OF THE INVENTION

Battery operated handheld power tools, such as grass trimmers and clearing saws are well known in the art.

In order to satisfy demanding consumers and professional users, battery operated tools having powerful motors and high capacity batteries are requested. In such high capacity tools a lot of heat may be generated in different heat generating components of the tool, such as in the electric motor and in a control unit arranged to control the motor.

Cooling of the electric motor by means of a fan, arranged in the vicinity of the motor is well known. However, there remains a need for an improved way of cooling the electric motor as well as other heat generating components of the power tool.

SUMMARY OF THE INVENTION

It is an object of the present invention to provide a battery driven power tool in which an enhanced cooling of the motor as well as other heat generating components can be obtained.

According to a first aspect of the solution, the object is at least partially achieved by means of a battery operated handheld power tool, comprising a working tool assembly, a handle assembly to which a battery pack may be detachably connected, and an elongate tubular rod interconnecting the working tool assembly and the handle assembly. The working tool assembly comprises a working tool of the battery operated handheld power tool, and a motor housing having a first inner space, in which first inner space an electric motor with a fan is provided. The electric motor is arranged to drive the working tool. The first inner space is connected to the exterior of the working tool assembly by means of at least one air outlet provided in the motor housing. The handle assembly comprises a housing and a second inner space in which a control unit arranged to control operation of the electric motor is positioned, the second inner space being in flow communication with the exterior of the handle assembly. The elongate tubular rod defines an air guiding channel, in flow communication with the first inner space and the second inner space, such that the fan is operable to move cooling air from the exterior of the handle assembly, via the second inner space, the air guiding channel of the tubular rod, to the first inner space and further to the exterior of the working tool assembly.

By configuring the power tool such that an air guiding channel within the elongate tubular rod interconnects the space in which the control unit is arranged and the space in which the motor and the fan is arranged, one single fan may be used for cooling the motor as well as the control unit, although they are positioned in separate parts of the power tool.

Furthermore, since the cooling air enters the tool in the handle assembly, at a distance from the working tool, the cooling air can be kept clean and free from dirt and debris, which may be present in the vicinity of the working tool assembly during operation of the working tool. Since the air inlets and the air outlets are positioned such that they are separated by means of the elongate tubular rod, heated air exiting the air outlets is unlikely to re-enter the power tool through the air inlets. Thereby, an efficient cooling is achieved.

Furthermore the walls of the elongate tubular rod may have a cooling effect on air which will pass through the air guiding channel, such that air which has been heated to some extent when passing the control unit, will be cooled again as it passes through the air guiding channel. Thereby, cooling of the motor is not negatively influenced by the fact that the cooling air has passed the control unit before reaching the motor.

According to an embodiment, the first inner space is connected to the air guiding channel of the tubular rod by means of a first opening provided in a lower portion of the elongate tubular rod, and the second inner space is connected to the air guiding channel of the elongate tubular rod by means of a second opening provided in an upper portion of the elongate tubular rod.

Thereby, manufacture of the power tool is made simple, since such openings are already provided in the elongate tubular rod, so as to enable passage of cabling operatively interconnecting the control unit and the electric motor.

According to another embodiment, an insulation wall is provided in the first inner space, dividing it into a first sub chamber, connected to the air guiding channel of the elongate tubular rod by means of the first opening, and a second sub chamber, connected to the exterior of the working tool assembly by means of the at least one air outlet.

Thereby, air heated by the electric motor is prevented from mixing with the cooling air arriving from the air guiding channel of the elongate tubular rod. Cooling of the motor is thereby made even more efficient.

According to yet another embodiment, the electric motor is a PMDC motor.

Since PMDC motors are cost-efficient and reliable, the choice of a PMDC motor may provide a robust power tool which may be manufactured at a low cost. A cooling fan is easily connected to a shaft or axle of a PMDC motor, and may also be arranged integrally with the motor.

According to another embodiment, the electric motor is a BLDC motor.

Thereby an enhanced power economy may be achieved, since BLDC motors may have a very good coefficient of utilization.

According to an embodiment, at least one air inlet is provided in the housing of the handle assembly, so as to establish a flow communication between the second inner space and the exterior of the handle assembly.

According to an embodiment, the at least one air inlet is provided in a rear portion of the handle assembly.

Thereby the air inlet is positioned as far away as possible from the dust and debris which may arise during operation of the working tool, and only clean air will enter the power tool through the air inlets. Thereby, the risk of dirt and debris reaching the control unit, the fan and other sensitive components of the power tool, is reduced.

According to an embodiment the at least one air inlet is provided in an upwardly facing surface of the handle assembly housing.

According to another embodiment the housing of the handle assembly comprises at least one auxiliary air inlet.

According to another embodiment the battery operated handheld power tool is a grass trimmer.

DEFINITIONS

As used herein different directions, such as upwardly, downwardly etc. are defined based on a point of view of an operator of the power tool, holding the power tool in a normal working position.

The extension direction between the handle assembly and the working tool is the longitudinal direction of the power tool.

BRIEF DESCRIPTION OF THE DRAWINGS

The invention will be understood and appreciated more fully from the following detailed description, taken in conjunction with the drawings, in which.

DESCRIPTION OF PREFERRED EMBODIMENTS

Figure 1:
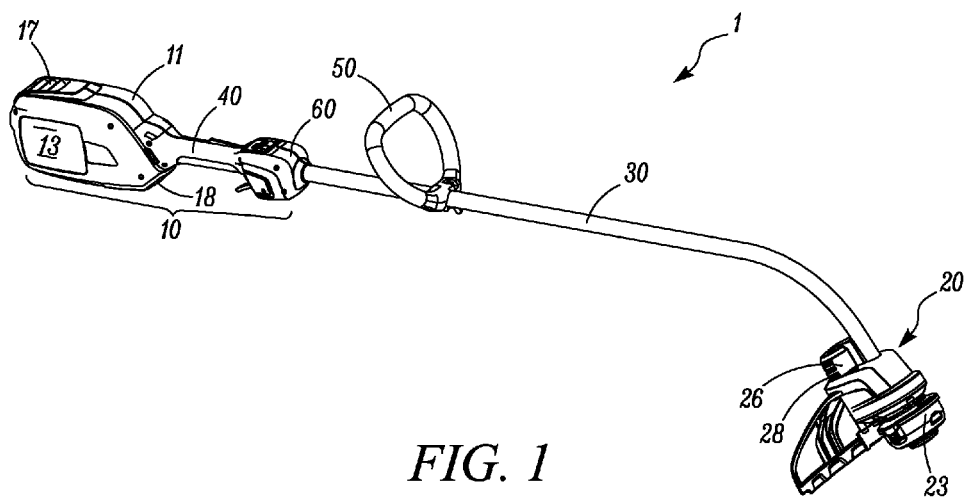
FIG. 1 is a perspective view of a battery powered handheld power tool according to the invention.

The present invention will be described more fully hereinafter with reference to the accompanying drawings, in which preferred embodiments of the invention are shown. The invention may, however, be embodied in many different forms and should not be construed as limited to the embodiments set forth herein; rather these embodiments are provided so that this disclosure will be thorough and complete, and will fully convey the scope of the invention to those skilled in the art. In the drawings, like numbers refer to like elements.

Referring to FIG. 1, a battery powered hand held power tool 1 embodied as a grass trimmer 1 is shown. The trimmer 1 has a handle assembly 10, comprising a main handle 40. A battery pack 13 may be detachably connected to the handle assembly 10. According to the embodiment shown in FIG. 1, the battery pack 13 is connected to a first body portion 11 of the handle assembly 10. The handle assembly 10 according to the embodiment shown in FIG. 1 also comprises a second body portion 60, separated from the first body portion by the main handle 40. However, a variety of other handle assembly configurations are also possible.

Figure 2:
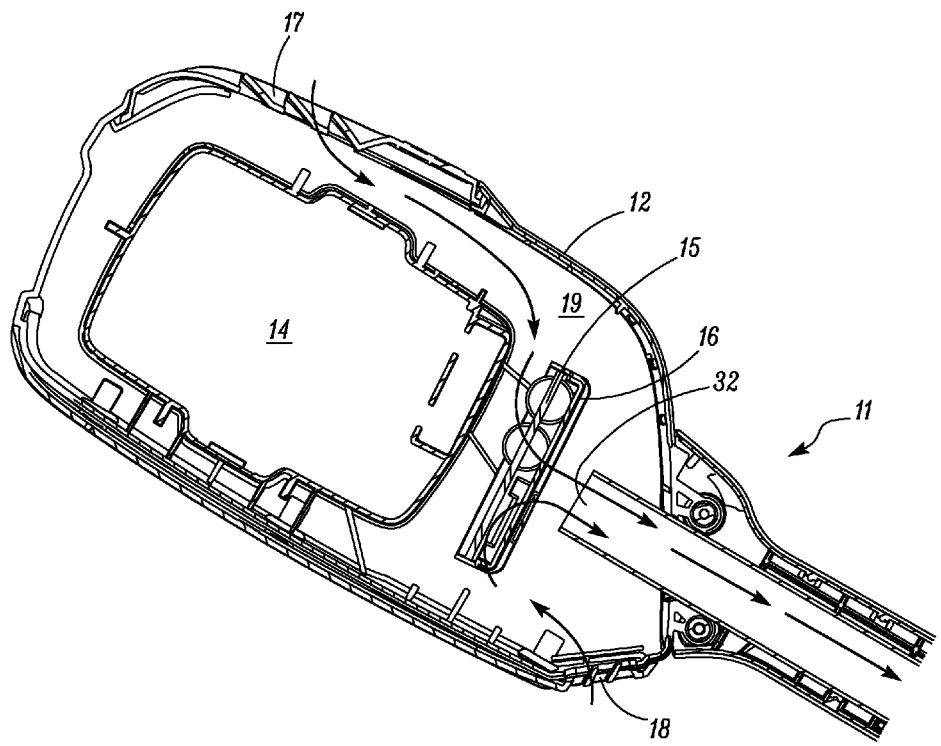
FIG. 2 is a cross sectional view of a portion of a handle assembly of the power tool shown in FIG. 1.

In the embodiment shown in FIGS. 1 and 2, the battery pack 13 is arranged to be inserted into a transversal through hole 14 defined by the first body portion 11 of the handle assembly 10. According to other possible embodiments, the battery pack may be arranged to be inserted in a blind hole arranged in a portion of the handle assembly 10. Alternatively, the battery pack may be arranged to be connected to an exterior surface of the handle assembly 10, such that it is connected to the handle assembly in one end only.

The battery powered hand held power tool 1 also comprises a working tool assembly 20 which in the case of a grass trimmer 1 is a cutting assembly 20.

Figure 3:
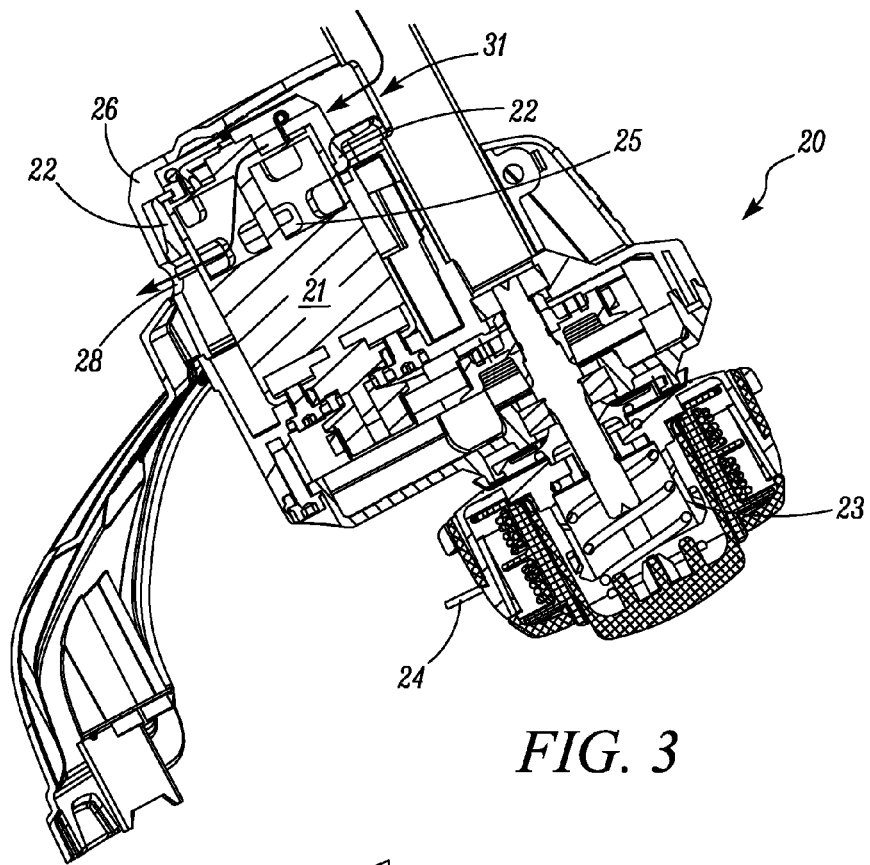
FIG. 3 is a cross sectional view of a working tool assembly of the power tool shown in FIG. 1.

As shown in FIG. 3 the working tool assembly comprises an electric motor 21 which is arranged to drive a working tool 24 of the battery powered hand held power tool 1.

In the embodiment shown in FIGS. 1 and 3, the working tool 24 is a cutting means 24, such as a trimmer line 24 or knife 24. The electric motor 21 forces a cutting means carrier 23 to rotate. The trimmer line 24 is connected to the cutting means carrier 23, so as to rotate therewith.

According to an embodiment, the electric motor 21 is a brushed electric motor. The brushed electric motor may be a permanent magnet direct current (PMDC) motor 21.

The motor 21 could also be a brushless direct current (BLDC) motor 21.

The electric motor 21 is energized by the battery pack 13.

A fan 25 is arranged in the vicinity of the electric motor. The fan 25 may be attached to a shaft or axle of the electric motor 21. A fan wheel may thus rotate with the motor axle or shaft, such that an air flow is generated, which air flow may be used for cooling the motor.

According to an embodiment, the motor 21 and the fan 25 may form a motor-fan-assembly in which the fan is connected to the motor shaft or axle, between a first 21a and a second 21b portion of the motor. The first portion 21a may comprise the commutating parts of the motor, such as a commutator and brushes.

The second portion 21b may comprise a rotor-stator-assembly of the motor 21. In FIG. 5b, a motor-fan-assembly according to the above description is schematically shown.

The fan 25 and the motor 21 are arranged in a first inner space 27 provided in a motor housing 26 of the working tool assembly 20. Air outlets 28 are provided in the motor housing, so as to establish flow communication between the first inner space 27 of the motor housing 26 and the ambient air, surrounding the working tool assembly 20.

The fan 25 and the motor parts 21a, 21b may be arranged in a casing, which is positioned in the first inner space 27 of the motor housing 26.

A portion of the elongate tubular rod 30 neighbors the inner space 27 of the motor housing 26, and an opening 31 is provided in that portion of the elongate tubular rod 30, so as to establish flow communication between an interior space 33 of the elongate tubular rod 30 and the inner space 27 of the motor housing 26.

The electric motor is controlled by means of a control unit 15, provided in the handle assembly. In the embodiment shown in FIG. 2, the control unit is arranged in a second interior space 19, defined in the handle assembly 10. The control unit may comprise a PCB with motor speed control circuitry etc. The control unit may be arranged in a metal housing 16. According to an embodiment, the housing is made from magnesium. The housing 16 may comprise cooling flanges.

Air inlets 17, 18 are provided in a housing of the handle assembly 10 so as to establish flow communication between the second inner space 19 and the ambient air, surrounding the handle assembly 10.

According to an embodiment, the battery pack 13 is provided with air guiding channels, leading through an interior of the battery pack 13, so as to allow a flow of cooling air through the battery pack, in order to achieve cooling of the battery pack.

The handle assembly may 10 then be configured so that cooling air will pass through the battery pack 13 before entering into the second inner space 19.

If such a battery pack is connected to the housing of the handle assembly in one end only, the battery pack may be provided with air inlets in an outwardly facing surface of the battery pack, and with air outlets in a surface facing towards the housing 12, so as to mate with air inlets 17 provided in the housing. Accordingly, ambient air will in that case pass through the battery pack 13 before entering the inner space 19 of the housing. However the inner space 19 is still connected to the exterior of the handle assembly by means of the air inlets 17, since the air inlets 17 are in fluid communication with the ambient air thanks to the battery pack air inlets and air outlets and the air guiding channel interconnecting them.

If a battery pack having air inlets, air outlets and an air guiding channel is inserted in a through hole 14 of the handle assembly, battery ventilation may be achieved in almost the same way as described above. A difference is that ambient air may pass through a portion of the handle assembly before entering the battery pack. As an illustrating example, referring to a handle assembly essentially configured as the one shown in FIG. 2, air inlets 17 may be provided in a rearwardly and upwardly facing surface of the housing which air inlets are in flow communication with air outlets provided in an inner wall of the through hole 14, such as in the rearmost/uppermost inner wall of the through hole 14. Those air outlets may be arranged so as to mate with air inlets provided in the battery pack. Air may then pass through the battery pack and further to air inlets 17 of the housing 12 which air inlets 17 may e.g. be provided in a front most wall of the through hole, so as to enter the inner space 19 in which the control unit is arranged. Accordingly, ambient air will in such case pass through a portion of the housing as well as through the battery pack 13 before entering the inner space 19 of the housing. However the inner space 19 is still connected to the exterior of the handle assembly by means of the air inlets 17, since the air inlets 17 are in fluid communication with the ambient air thanks to the battery pack air inlets and air outlets and the air guiding channel interconnecting them.

If battery cooling according to the above description is not considered necessary, a battery pack having air guiding channels may of course be used also with handle assemblies 10 without air inlets mating with the battery pack, such as with a handle assembly according to the FIGS. 1 and 2.

The second inner space 19 is in flow communication with the inner space 33 of the elongate tubular rod 30. An end portion of the tubular rod 30 may extend into the second inner space 19 and an opening 32 in the end of the rod 30 may be provided such that flow communication is established between the second inner space 19 and the inner space 33 of the rod 30.

The inner space 33 of the elongate tubular rod 30 defines an air guiding channel 33, through which air may flow from the handle assembly 10 towards the working tool assembly 20.

Cabling operatively interconnecting the control unit 15 and the electric motor 21 may preferably extend in the air guiding channel 33.

During operation of the power tool 1, the fan 25 will rotate and generate a flow of air directed from the handle assembly 10 towards the electric motor 21. The fan 25 may be a radial fan or an axial fan.

During operation of the power tool 1, the fan will generate an air current such that cooling air enters through the inlet 17 provided in the housing 12 of the handle assembly. There may also be additional air inlets 18. Then, the air will flow through the second inner space 19, provided in the housing of the handle assembly 10, and further through the second opening 32 provided in the tubular rod 30, so as to enter the inner space 33 provided in the tubular rod. As the cooling air flows through the second inner space 19, it cools the control unit housing 16 and the control unit 15.

As the cooling air flows through the inner space 33 of the tubular rod 30, the walls of the tubular rod 30 may have a cooling effect on the air.

The cooling air will then enter the first inner space 27 provided in the motor housing 26, via the first opening 31 provided in the tubular rod 30.

The cooling air will pass the fan 25 and the motor 21, so as to cool different parts of the motor 21, and will then exit from the first inner space 27 through an opening 28 provided in the motor housing.

Figure 5A:
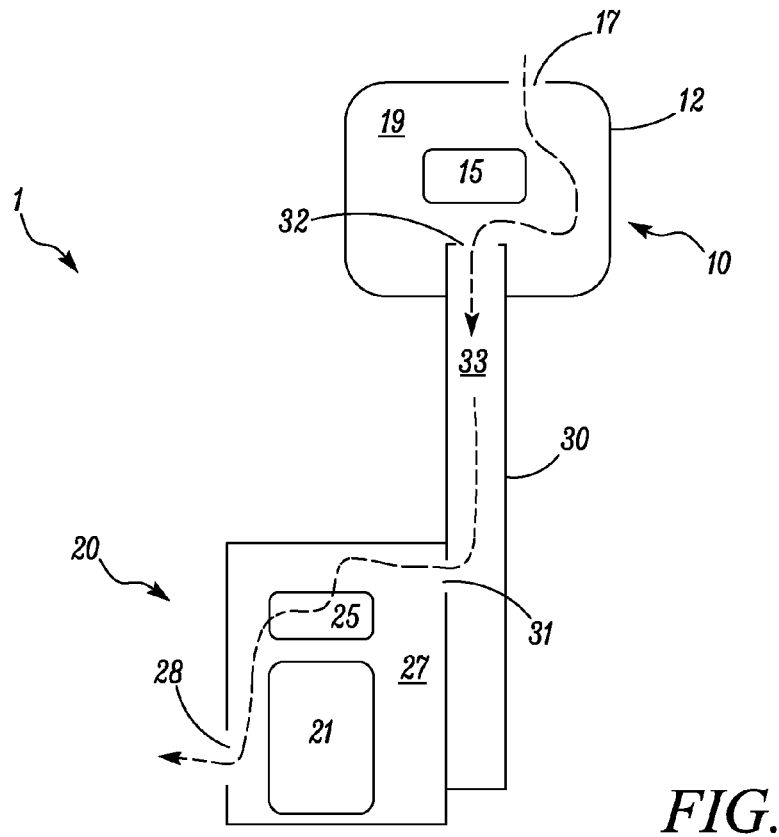
FIG. 5a is a schematic view of some parts of a power tool according to the invention, showing an air flow through the power tool.
Figure 5B:
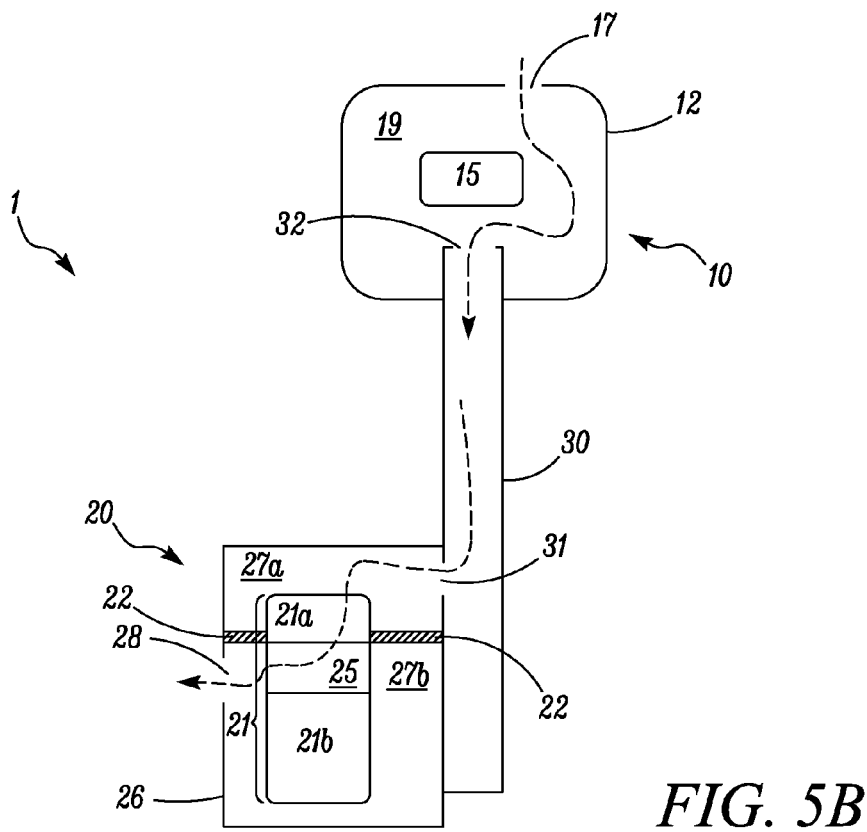
FIG. 5b is a schematic view of some parts of a power tool according to an embodiment of the invention, showing an air flow through the power tool.

The above described air flow is schematically shown in FIG. 5a.

According to an embodiment of the invention, an insulating wall 22 is provided in the first inner space 27. The insulating wall 22 divides the first inner space into a first sub chamber 27a, connected to the air guiding channel 33 of the elongate tubular rod 30 by means of the opening 31 in the rod, and a second sub chamber 27b, connected to the exterior of the working tool assembly 20 by means of the at least one air outlet 28 provided in the motor housing 26.

In the embodiment schematically shown in FIG. 5b, such an insulating wall 22 is provided in the first inner space 27.

Figure 4:
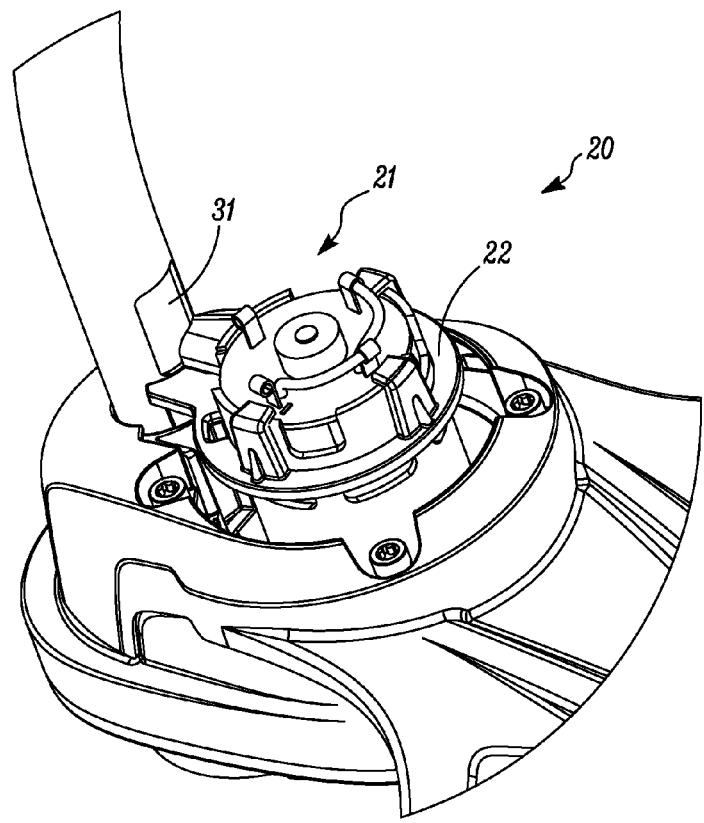
FIG. 4 is a partial perspective view of the working tool assembly, with a portion of the housing removed.

In FIG. 4, a cutting assembly 20 provided with an insulating wall is partially shown. In the figure, a part of the motor housing 26 has been removed, so as to reveal the insulating wall 22.

In that case, cooling air arriving from the interior space 33 of the tubular rod will enter the first sub chamber 27a. According to an embodiment, a first part 21a of the motor 21, comprising the commutating components of the motor such as the brushes and the commutator may be positioned at least partly within the first sub chamber 27a. The cooling air will pass by these components before reaching the fan 25. Since the brushes of the motor may generate a lot of heat, it is particularly critical that they are efficiently cooled. The cooling air will probably be warmed up as it passes the brushes, such that the air current entering into the second sub chamber 27b is warmer than the air current entering into the first sub chamber 27a. Thanks to the insulating wall 22, the air which has once passed the brushes and has entered the second sub chamber 27b is prevented from re-entering the first sub chamber 27a. Thereby an enhanced cooling of the brushes may be achieved.

The air entering the second sub chamber 27b will still have a cooling effect on the parts 21b of the motor 21 positioned in the second sub chamber 27b, although the air may be heated to some extent. Furthermore, a turbulence arising in the second sub chamber 27b, due to an overpressure generated within the chamber, will have a cooling effect on the parts of the motor 21 positioned in the second sub chamber.

The cooling air will exit from the second sub chamber 27b through the opening 28 or openings 28 provided in the motor housing 26.

In the drawings and specification, there have been disclosed preferred embodiments and examples of the invention and, although specific terms are employed, they are used in a generic and descriptive sense only and not for the purpose of limitation, the scope of the invention being set forth in the following claims.

The invention claimed is:

1. A battery operated handheld power tool, comprising:
    a working tool assembly,
    a handle assembly to which a battery pack is detachably connectable, and
    an elongate tubular rod interconnecting the working tool assembly and the handle assembly;
    wherein the working tool assembly comprises a working tool of the battery operated handheld power tool, and a motor housing having a first inner space, in the first inner space an electric motor with a fan is provided, the electric motor being arranged to drive the working tool, the first inner space being in flow communication with an exterior of the working tool assembly via at least one air outlet provided in the motor housing;
    wherein the handle assembly comprises a handle housing and a second inner space in which a control unit is positioned, the second inner space being in flow communication with an exterior of the handle assembly,
    wherein the control unit comprises a printed circuit board, and
    wherein the elongate tubular rod defines an air guiding channel in flow communication with the first inner space and the second inner space, such that the fan is operable to move cooling air from an exterior of the handle housing of the handle assembly, via the second inner space, through the air guiding channel of the tubular rod to the first inner space and further to the exterior of the working tool assembly via the at least one air outlet.

2. A battery operated handheld power tool according to claim 1, wherein the first inner space is in flow communication with the air guiding channel of the tubular rod via a first opening provided in a lower portion of the elongate tubular rod, and wherein the second inner space is in flow communication with the air guiding channel of the elongate tubular rod via a second opening provided in an upper portion of the elongate tubular rod.

3. A battery operated handheld power tool according to claim 2, wherein an insulation wall is provided in the first inner space, dividing the first inner space into a first sub chamber, in flow communication with the air guiding channel of the elongate tubular rod via the first opening, and a second sub chamber, in flow communication with the exterior of the working tool assembly via the at least one air outlet.

4. A battery operated handheld power tool according to claim 3, wherein the electric motor comprises a first part and a second part, the first part having commutating components, wherein the first part of the electric motor is positioned at least partly within the first sub chamber, and wherein the second part of the electric motor is positioned within the second sub chamber.

5. A battery operated handheld power tool according to claim 4, wherein the fan is positioned between the first part and the second part of the electric motor thereby allowing the cooling air to pass by the commutating components before reaching the fan.

6. A battery operated handheld power tool according to claim 3, wherein the insulation wall is provided in the first inner space in a direction perpendicular to a portion of the guiding channel of the tubular rod proximate the handle housing.

7. A battery operated handheld power tool according to claim 1, wherein the electric motor is a PMDC motor.

8. A battery operated handheld power tool according to claim 1, wherein the electric motor is a BLDC motor.

9. A battery operated handheld power tool according to claim 1, wherein at least one air inlet is provided in the handle housing, so as to establish a flow communication between the second inner space and the exterior of the handle housing.

10. A battery operated handheld power tool according to claim 9, wherein the at least one air inlet is provided in a rear portion of the handle housing.

11. A battery operated handheld power tool according to claim 9, wherein the at least one air inlet is provided in an upwardly facing surface of the handle housing.

12. A battery operated handheld power tool according to claim 9, wherein the at least one air inlet comprises a first air inlet and a second air inlet, the first air inlet being provided on a downwardly facing surface of the handle housing and the second air inlet being provided on an upwardly facing surface of the handle housing.

13. A battery operated handheld power tool according to claim 1, wherein the handle housing comprises at least one auxiliary air inlet.

14. A battery operated handheld power tool according to claim 1, wherein the battery operated handheld power tool is a grass trimmer.

15. A battery operated handheld power tool according to claim 1, wherein the at least one air outlet is on a surface of the motor housing facing towards the handle housing.

16. A battery operated handheld power tool according to claim 1, wherein cabling operatively interconnects the control unit located in the second inner space of the handle assembly to the electric motor located in the first inner space of the motor housing.

17. A battery operated handheld power tool according to claim 1, wherein the control unit is arranged in a metal housing disposed within the handle housing.

18. A battery operated handheld power tool according to claim 17, wherein the metal housing comprises cooling flanges.

19. A battery operated handheld power tool according to claim 1, wherein when the battery pack is detachably connected to an end of the handle housing, the battery pack comprises at least one air inlet provided on an outwardly facing surface of the battery pack and at least one air outlet provided on a surface of the battery pack facing towards the handle housing.

* * * * *